US012783182B2

(12) United States Patent
Sera et al.

(10) Patent No.: US 12,783,182 B2
(45) Date of Patent: Nov. 3, 2026

(54) PRINT CONTROL DEVICE, CONTROL METHOD, AND PROGRAM ACQUIRING FILE SAVING INSTRUCTION FROM USER TERMINAL VIA CHAT SERVICE

(71) Applicant: SEIKO EPSON CORPORATION, Tokyo (JP)

(72) Inventors: Takashi Sera, Shiojiri (JP); Kohei Yamamoto, Matsumoto (JP); Katsuhito Kitahara, Matsumoto (JP); Masayuki Kobayashi, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 236 days.

(21) Appl. No.: 18/825,786

(22) Filed: Sep. 5, 2024

(65) Prior Publication Data

US 2025/0077131 A1 Mar. 6, 2025

(30) Foreign Application Priority Data

Sep. 5, 2023 (JP) ................................ 2023-143473

(51) Int. Cl.

*G06F 3/12* (2006.01)
*H04L 51/02* (2022.01)

(Continued)

(52) U.S. Cl.

CPC .......... *G06F 3/1204* (2013.01); *G06F 3/1205* (2013.01); *G06F 3/1253* (2013.01); *G06F 3/1267* (2013.01); *G06F 3/1268* (2013.01); *G06F 3/1288* (2013.01); *H04L 51/02* (2013.01); *H04L 51/18* (2013.01); *H04N 1/00209* (2013.01); *H04N 1/00244* (2013.01); *H04N 1/00344* (2013.01); *H04N 1/00411* (2013.01);

(Continued)

(58) Field of Classification Search

CPC .... G06F 3/1204; G06F 3/1205; G06F 3/1253; G06F 3/1267; G06F 3/1268; G06F 3/1288; H04L 51/02; H04L 51/18; H04N 1/00209; H04N 1/00244; H04N 1/00344; H04N 1/00411; H04N 1/00474; H04N 2201/0082

See application file for complete search history.

(56) References Cited

U.S. PATENT DOCUMENTS 11,354,080 B2 * 6/2022 Shimomoto .......... G06F 3/1285
11,843,731 B2 * 12/2023 Uchida ............. H04N 1/00209

(Continued)

FOREIGN PATENT DOCUMENTS

JP 2022-021846 A 2/2022

*Primary Examiner* — Scott A Rogers
(74) *Attorney, Agent, or Firm* — WORKMAN NYDEGGER

(57) ABSTRACT

A print control device configured to be able to communicate with a terminal device via a chat server providing a chat service includes: a saving instruction acquisition unit configured to acquire a saving instruction giving an instruction to save a file, from the terminal device via the chat service; a file acquisition unit configured to acquire a file to be saved corresponding to the saving instruction; a storage configured to store the acquired file; a print instruction acquisition unit configured to acquire a print instruction giving an instruction to print the stored file, from the terminal device via the chat service; and a print controller configured to cause an image forming device to execute printing of the file for which the instruction to print is given by the print instruction.

11 Claims, 13 Drawing Sheets

(51) Int. Cl.
*H04L 51/18* (2022.01)
*H04N 1/00* (2006.01)

(52) U.S. Cl.
CPC . *H04N 1/00474* (2013.01); *H04N 2201/0082* (2013.01)

(56) References Cited

U.S. PATENT DOCUMENTS

| | | | | |
|---|---|---|---|---|
| 2005/0168772 | A1* | 8/2005 | Kim | G06F 3/1288 358/1.15 |
| 2013/0077129 | A1* | 3/2013 | Soh | H04N 1/00244 358/1.15 |
| 2020/0097221 | A1* | 3/2020 | Matsumoto | G06F 3/1204 |
| 2020/0099642 | A1* | 3/2020 | Mishima | H04L 51/52 |
| 2020/0099799 | A1* | 3/2020 | Obayashi | H04L 51/02 |
| 2021/0191672 | A1* | 6/2021 | Saito | G06F 3/1205 |
| 2022/0109644 | A1* | 4/2022 | Zhang | G06F 9/546 |
| 2022/0214845 | A1* | 7/2022 | Ohashi | H04L 51/02 |
| 2023/0062471 | A1* | 3/2023 | Hasegawa | H04N 1/00233 |
| 2023/0081475 | A1* | 3/2023 | Magallanes | G06F 40/35 358/1.15 |
| 2023/0251807 | A1* | 8/2023 | Okayama | G06F 3/1207 358/1.15 |
| 2024/0314251 | A1* | 9/2024 | Takeo | H04N 1/00217 |
| 2025/0130740 | A1* | 4/2025 | Hanano | G06F 3/1222 |
| 2025/0165199 | A1* | 5/2025 | Hanano | G06F 3/1267 |

* cited by examiner

PRINT CONTROL DEVICE, CONTROL METHOD, AND PROGRAM ACQUIRING FILE SAVING INSTRUCTION FROM USER TERMINAL VIA CHAT SERVICE

The present application is based on, and claims priority from JP Application Serial Number 2023-143473, filed Sep. 5, 2023, the disclosure of which is hereby incorporated by reference herein in its entirety.

BACKGROUND

1. Technical Field

The present disclosure relates to a print control device, a control method, and a non-transitory computer-readable storage medium storing a program.

2. Related Art

A technique in which a print system collaborates with another system used by a user and thus implements printing for which an instruction is given by the user is known. For example, JP-A-2022-21846 discloses a technique in which a web conference system and a print system collaborate with each other to implement printing for which an instruction is given by a user.

JP-A-2022-21846 is an example of the related art.

When a system providing a chat service where messages and the like are posted and a print system collaborate with each other, a print request to the print system can be given via the chat service. However, in order to implement printing, the user needs to find a file to be printed each time of the printing from a storage device of a terminal device or a cloud storage or the like, and this takes user's time and effort.

SUMMARY

According to an aspect of the present disclosure, a print control device configured to be able to communicate with a terminal device via a chat server providing a chat service is provided, the print control device including: a saving instruction acquisition unit configured to acquire a saving instruction giving an instruction to save a file, from the terminal device via the chat service; a file acquisition unit configured to acquire a file to be saved corresponding to the saving instruction; a storage unit configured to store the acquired file; a print instruction acquisition unit configured to acquire a print instruction giving an instruction to print the stored file, from the terminal device via the chat service; and a print control unit configured to cause an image forming device to execute printing of the file for which the instruction to print is given by the print instruction.

According to another aspect of the present disclosure, a control method for a print control device configured to be able to communicate with a terminal device via a chat server providing a chat service is provided, the control method including: acquiring a saving instruction giving an instruction to save a file, from the terminal device via the chat service; acquiring a file to be saved corresponding to the saving instruction; causing a storage unit to store the acquired file; acquiring a print instruction giving an instruction to print the stored file, from the terminal device via the chat service; and causing an image forming device to execute printing of the file for which the instruction to print is given by the print instruction.

According to still another aspect of the present disclosure, a non-transitory computer-readable storage medium storing a program is provided, the program causing a computer of a print control device configured to be able to communicate with a terminal device via a chat server providing a chat service to execute: a saving instruction acquisition step of acquiring a saving instruction giving an instruction to save a file, from the terminal device via the chat service; a file acquisition step of acquiring a file to be saved corresponding to the saving instruction; a storage step of causing a storage unit to store the acquired file; a print instruction acquisition step of acquiring a print instruction giving an instruction to print the stored file, from the terminal device via the chat service; and a print control step of causing an image forming device to execute printing of the file for which the instruction to print is given by the print instruction.

DESCRIPTION OF EMBODIMENTS

Figure 1:
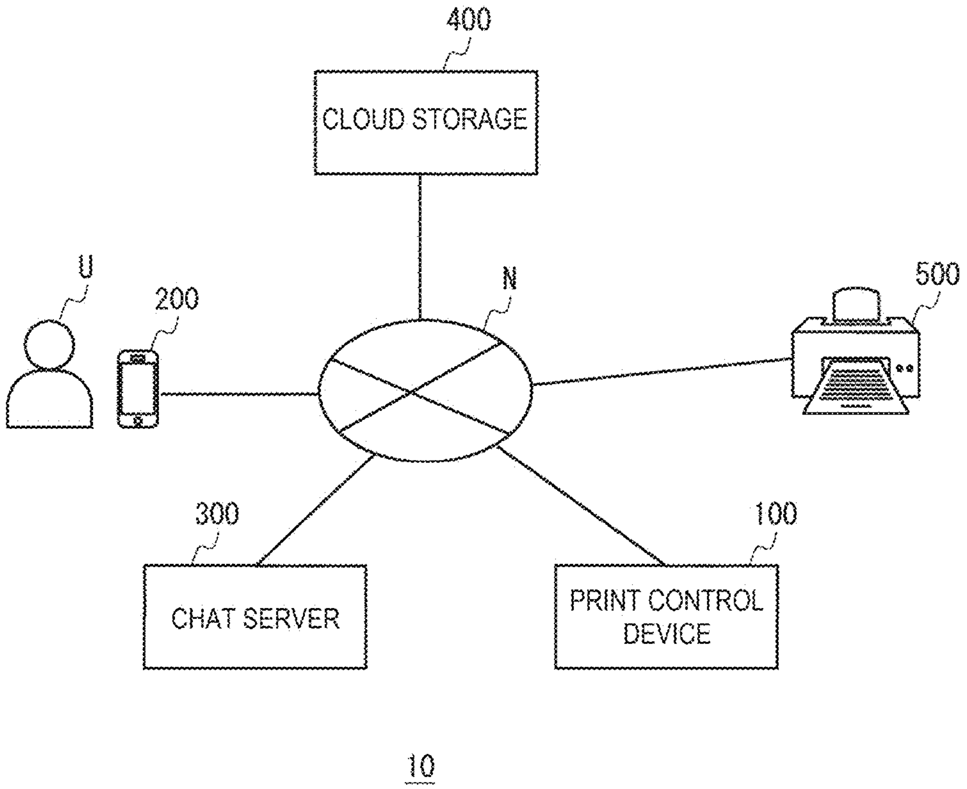
FIG. 1 is a block diagram showing an example of the configuration of an information processing system according to an embodiment.

Embodiments will now be described with reference to the drawings. To clarify the explanation, suitable omissions and simplifications are made in the description and the drawings given below. In the drawings, the same elements are denoted by the same reference sign and a repeated description thereof is omitted where appropriate.

Embodiment 1

FIG. 1 is a block diagram showing an example of the configuration of an information processing system 10 according to an embodiment. In the example shown in FIG. 1, the information processing system 10 includes a terminal device 200, a chat server 300, a cloud storage 400, a print control device 100, and an image forming device 500. The terminal device 200, the chat server 300, the cloud storage 400, the print control device 100, and the image forming device 500 are connected to a network N such as the internet. The chat server 300 constitutes a chat system. The print control device 100 constitutes a print system. Therefore, the information processing system 10 is a system where a chat system and a print system collaborate with each other. A system formed of the print control device 100 and the image forming device 500 may be referred to as a print system.

In this embodiment, the terminal device 200 is communicably connected at least to the chat server 300. The print control device 100 is communicably connected at least to the chat server 300, the cloud storage 400, and the image forming device 500. However, when a file stored in the cloud storage 400 need not be printed, the information processing system 10 may not include the cloud storage 400.

The terminal device 200 is a device operated by a user U and is, for example, a smartphone, a tablet terminal, a personal computer or the like. In the terminal device 200, application software (also referred to as a chat app) to use a chat service provided by the chat server 300 is installed. The user U is a user having an account to use the chat service and can use the chat service, using the terminal device 200. The account includes identification information to identify the user, and other information associated with the identification information. Specifically, for example, the account includes a password or the like in addition to the user ID. While one terminal device 200 and one user U are illustrated in FIG. 1, a plurality of users can use the information processing system 10. Therefore, the information processing system 10 can include a plurality of terminal devices 200.

The chat server 300 is a server providing a chat service. The chat server 300 may be formed of a plurality of servers. In the chat service, members participating in the same chat room make postings and thus can chat with each other. The chat room is a virtual space where members exchange postings. The chat room is also referred to as a talk room, a channel, or a workspace. In this embodiment, when the user U makes an input to the chat room in which the print control device 100 participates as a member, the chat server 300 transmits the content of the input to the chat room along with the identification information of the user U making the input, to the print control device 100. Therefore, the print control device 100 receives the identification information of the user U making the input and the content of the input, from the chat server 300. The input to the chat room by the user U may be a posting of a text or a file to the chat room or may be a saving instruction or a print instruction, described later. The input (posting) to the chat room by the user U is made using the terminal device 200 and therefore can be said to be an input (posting) to the chat room by the terminal device 200.

The print control device 100 is a device functioning as a chatbot and can communicate with the terminal device 200 via the chat server 300 providing the chat service. The chatbot is a software robot that receives data posted in the chat service and performs processing corresponding to the data. The print control device 100 has an account to use the chat service and participates as a member in the chat room in which the user U participates as a member. The print control device 100 also performs processing to cause the image forming device 500 to print a file. The print control device 100 is, for example, a server, but is not limited to the server and may be any device having functions of a computer. The print control device 100 may be formed of a plurality of computers (a plurality of servers).

The cloud storage 400 is a storage that stores any file that can be a file to be printed. In this embodiment, the user U may instruct the print control device 100 to save a file stored in the cloud storage 400.

The image forming device 500 is a device having a function of performing print processing and is specifically, for example, a printer. The image forming device 500 is registered with the print control device 100 in advance as an image forming device used for printing. While one image forming device 500 is illustrated in FIG. 1, a plurality of image forming devices 500 may be registered with the print control device 100 as image forming devices available for printing. For example, the image forming device 500 may be registered with the print control device 100, corresponding to each user U. In this embodiment, the print control device 100 causes the image forming device 500 associated with the account of the user U to print a file designated as a file to be printed by the user U.

Figure 2:
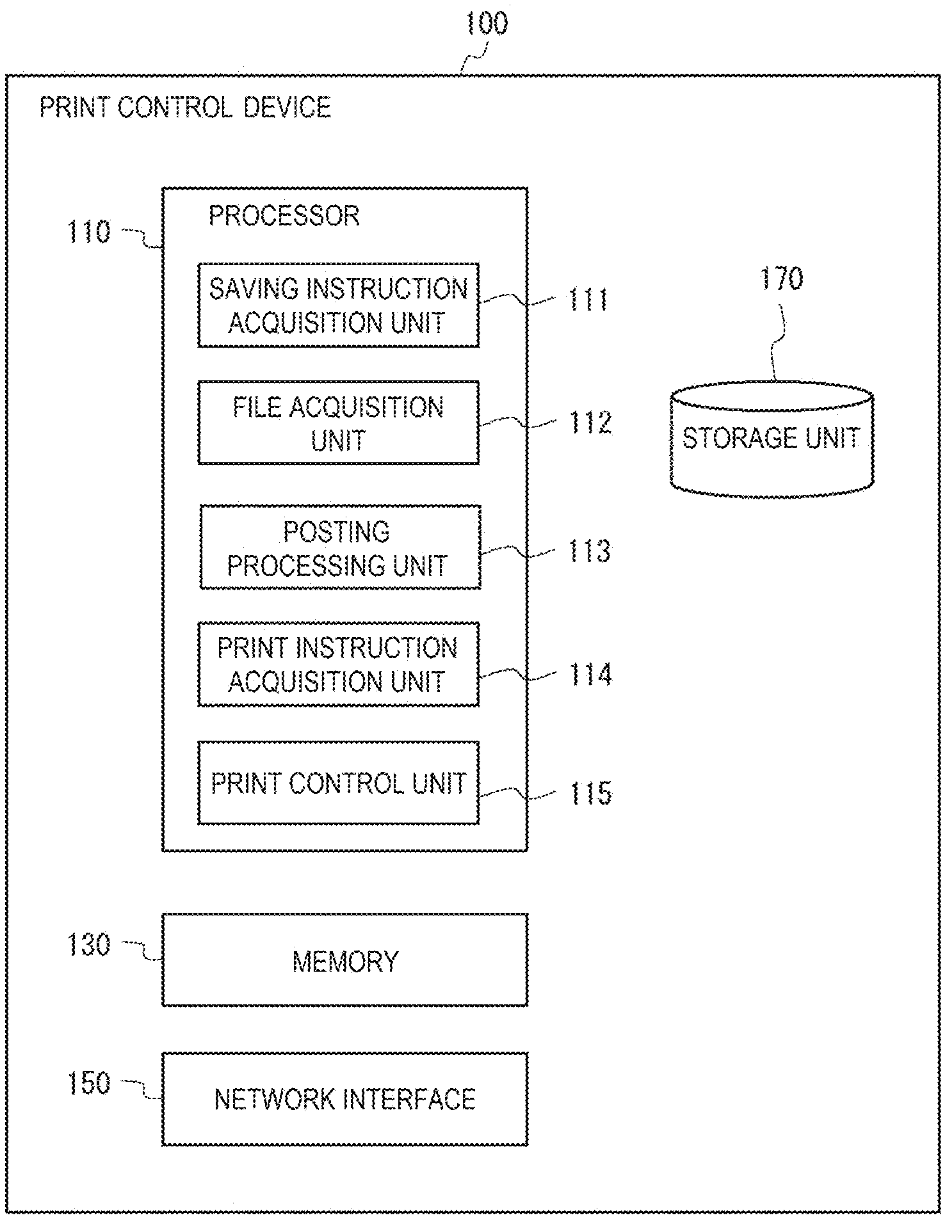
FIG. 2 is a block diagram showing an example of the configuration of a print control device according to Embodiment 1.

The specific configuration of and processing by the print control device 100 will now be described. FIG. 2 is a block diagram showing an example of the configuration of the print control device 100 according to Embodiment 1. As shown in FIG. 2, the print control device 100 has a processor 110, a memory 130, a network interface 150, and a storage unit 170. In this way, the print control device 100 has functions of a computer.

The network interface 150 is used to communicate via the network N. The network interface 150 may include, for example, a network interface card (NIC).

The memory 130 is formed of, for example, a combination of a volatile memory and a nonvolatile memory. The memory 130 is used to store a program or the like executed by the processor 110.

The processor 110 reads out the program from the memory 130 and executes the program. Thus, the processor 110 implements the functions of a saving instruction acquisition unit 111, a file acquisition unit 112, a posting processing unit 113, a print instruction acquisition unit 114, and a print control unit 115, described later. The processor 110 may be, for example, a microprocessor, a microprocessor unit (MPU), or a central processing unit (CPU) or the like. The processor 110 may include a plurality of processors.

The program includes a command set (or software code) to cause a computer to execute one or more functions described in the embodiment, when read by the computer. The program may be stored in a non-transitory computer-readable medium or a tangible storage medium. Examples of the computer-readable medium or the tangible storage medium include, but not limited to, a random-access memory (RAM), a read-only memory (ROM), a flash memory, a solid-state drive (SSD) or other memory techniques, a CD-ROM, a digital versatile disc (DVD), a Blu-ray (trademark registered) disc or other optical disc storages, a magnetic cassette, a magnetic tape, a magnetic disk storage or other magnetic storage devices. The program may be transmitted on a transitory computer-readable medium or a communication medium. Examples of the transitory computer-readable medium or the communication medium include, but not limited to, electrical, optical, acoustic or other forms of propagation signals.

The saving instruction acquisition unit 111, the file acquisition unit 112, the posting processing unit 113, the print instruction acquisition unit 114, and the print control unit 115 will now be described.

The saving instruction acquisition unit 111 acquires a saving instruction giving an instruction to save a file, from the terminal device 200. In this embodiment, the saving instruction acquisition unit 111 acquires the saving instruction indirectly from the terminal device 200 via the chat server 300. The saving instruction includes information specifying a file to be saved. The information specifying a file to be saved may be the file to be saved itself, the uniform resource locator (URL) of the file to be saved, or the file path of the file to be saved.

The user U can designate any file for which an instruction to print may be given, as a file to be saved, but preferably designates a file which the user U wants to print repeatedly, as a file to be saved. The user U transmits a saving instruction by operating the terminal device 200. In this way, the saving instruction by the user U is an instruction given by using the terminal device 200 and therefore may be referred to as a saving instruction from the terminal device 200 or a saving instruction by the terminal device 200, or the like. In this embodiment, the user U gives an instruction to save a file via the chat service. That is, the user U gives an instruction to save a file in the chat room used for the chat service. To describe this more in detail, the user U gives an instruction to save a file in the chat room in which the print control device 100 participates as a chatbot. For example, the user U posts the file to be saved along with a text giving an instruction to save such as "Save file", in the chat room, as the saving instruction. The user U may post the URL of the file to be saved, instead of posting the file to be saved in the chat room. For example, this URL may be the URL of the file stored in the cloud storage 400. As the user U gives the instruction to save, the saving instruction acquisition unit 111 acquires the saving instruction via the chat service. That is, the saving instruction acquisition unit 111 acquires the saving instruction given in the chat room in which the user U and the print control device 100 as a chatbot participate. When the saving instruction acquisition unit 111 acquires the saving instruction via the chat service, specifically, the saving instruction acquisition unit 111 acquires the saving instruction given in the chat room, from the chat server 300. To describe this more in detail, the saving instruction acquisition unit 111 acquires the saving instruction given in the chat room along with the identification information of the user U giving the saving instruction, from the chat server 300.

The file acquisition unit 112 acquires the file to be saved corresponding to the saving instruction acquired by the saving instruction acquisition unit 111. That is, the file acquisition unit 112 acquires the file for which an instruction to save is given by the saving instruction acquired by the saving instruction acquisition unit 111. When the user U posts a file to be saved in the chat room, the file acquisition unit 112 acquires the file to be saved from the chat server 300. To describe this more in detail, the file acquisition unit 112 acquires the file posted in the chat room along with the identification information of the user U making this post, from the chat server 300. The file acquisition unit 112 acquires, for example, a file posted immediately after a posting of a text giving an instruction to save, as the file to be saved corresponding to the saving instruction. The file acquisition unit 112 may acquire a file posted immediately before a posting of a text giving an instruction to save, as the file to be saved corresponding to the saving instruction. When the URL of the file is posted instead of the file, the file acquisition unit 112 acquires the posted URL from the chat server 300 and subsequently acquires the file to be saved, based on the acquired URL. For example, the file acquisition unit 112 acquires the file indicated by the URL from the cloud storage 400.

When the file acquisition unit 112 acquires the file to be saved, the file acquisition unit 112 causes the storage unit 170 to store the acquired file. The file acquisition unit 112 causes the storage unit 170 to store the file in such a way that which user the file corresponds to is specified. That is, the file acquisition unit 112 stores the file in association with the identification information of the user, in the storage unit 170. For example, the file acquisition unit 112 stores the file in a folder that differs from one user to another. The storage unit 170 is a storage storing the file to be saved. As described above, the storage unit 170 stores the file in association with the identification information of the user. As the file to be saved is managed corresponding to each user in this way, a plurality of users can properly use the information processing system 10.

The posting processing unit 113 posts data such as a text in the chat room in which the print control device 100 participates as a chatbot. Specifically, the posting processing unit 113 transmits data to be posted to the chat server 300. For example, when the file to be saved is stored in the storage unit 170, the posting processing unit 113 posts a text of a message informing that the saving has been properly performed. Also, for example, when print processing is to be started in response to a print instruction, described later, the posting processing unit 113 posts a text of a message informing that the printing will be started. These postings are simply examples of posting by a chatbot and the posting processing unit 113 may give various other postings than the above postings.

Figure 6:
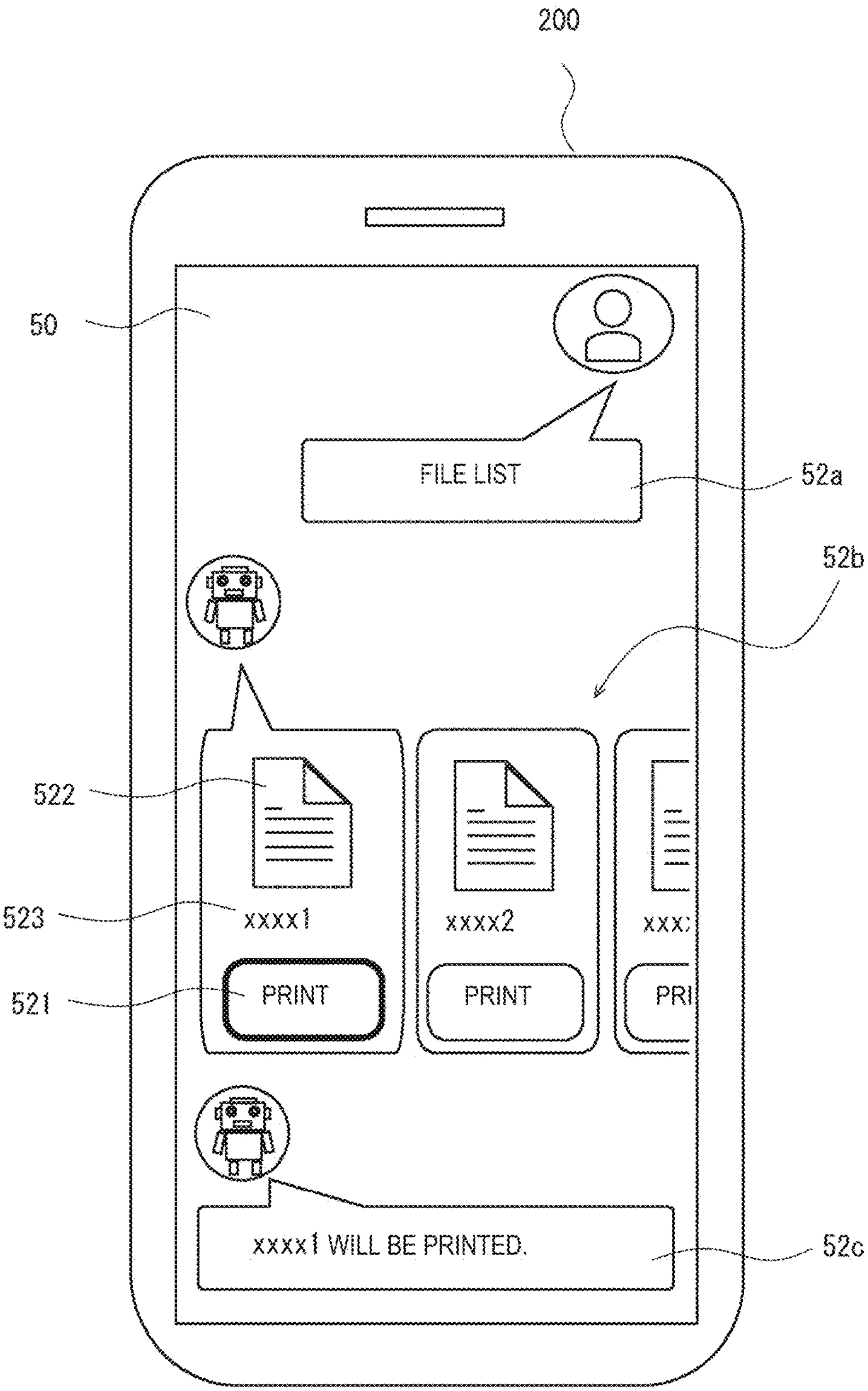
FIG. 6 is a schematic view showing an example of the screen of the terminal device when printing of a file is performed via the chat service.

The posting processing unit 113 also performs predetermined processing for a posting from the user U except the saving instruction and the print instruction, posted in the chat room in which the print control device 100 participates as a chatbot. Particularly, the posting processing unit 113 posts a list of files stored in the storage unit 170, in the chat room. Specifically, the posting processing unit 113 transmits the list to the chat server 300 and thus posts the list in the chat room. For example, when a text requesting a list such as "File list" is posted from the user U (that is, the terminal device 200), the posting processing unit 113 posts a list of files stored in the storage unit 170 and corresponding to the user U giving this posting, in the chat room. In this list, a print button 521 to give an instruction to print may be added to each file, as shown in FIG. 6, described later.

The print instruction acquisition unit 114 acquires a print instruction giving an instruction to print a file from the terminal device 200. In this embodiment, the print instruction acquisition unit 114 acquires the print instruction indirectly from the terminal device 200 via the chat server 300. The print instruction includes information specifying the file to be printed. Particularly, the print instruction acquisition unit 114 acquires a print instruction giving an instruction to print a file stored in the storage unit 170, from the terminal device 200 via the chat service. The user U transmits the print instruction by operating the terminal device 200. In this way, the print instruction by the user U is an instruction given by using the terminal device 200 and therefore may be referred to as a print instruction from the terminal device 200 or a print instruction by the terminal device 200, or the like. In this embodiment, the user U gives an instruction to print a file via the chat service. That is, the user U gives the instruction to print a file in the chat room used for the chat service. To describe this more in detail, the user U gives the instruction to print a file in the chat room in which the print control device 100 participates as a chatbot. For example, the user U posts a text requesting the printing of a file with a file name "xxxx", such as "Print xxxx", in the chat room, as the print instruction. The user U may designate the file to be printed by a nickname that can identify the file, instead of designating the file to be printed with a file name, in the print instruction. In this case, for example, when giving a saving instruction for a file, the user U designates a nickname of the file. The file acquisition unit 112 causes the storage unit 170 to store the nickname designated for the file, in association with the file.

The user U may give a print instruction by other methods, without being limited to the posting of a text with the designation of a file name or a nickname. For example, the user U may give a print instruction by selecting the file to be printed from a list of files stored in the storage unit 170. In this case, the print instruction acquisition unit 114 acquires an instruction including the selection of the file to be printed from the list, as the print instruction. For example, the user U performs an operation of selecting the file to be printed from files in a list posted in the chat room. This operation may be a press on a print button to give an instruction to print, displayed corresponding to each file, in the list. As the print button is operated in the chat room, a print instruction for the file corresponding to the print button is given. As the list is displayed in this way, the user can more easily designate the file to be printed.

As the user U gives the instruction to print, the print instruction acquisition unit 114 acquires the print instruction via the chat service. That is, the print instruction acquisition unit 114 acquires the print instruction given in the chat room in which the user U and the print control device 100 as a chatbot participate. Specifically, the print instruction acquisition unit 114 acquires the print instruction given in the chat room, from the chat server 300. To describe this more in detail, the print instruction acquisition unit 114 acquires the print instruction given in the chat room along with the identification information of the user U giving the print instruction, from the chat server 300.

The print control unit 115 causes the image forming device 500 to execute the printing of the file for which the instruction to print is given by the print instruction acquired by the print instruction acquisition unit 114. The print control unit 115 causes the image forming device 500 corresponding to the identification information of the user giving the printing instruction, to execute the printing of the file. Since the image forming device 500 corresponding to the user is selected in this way, a plurality of users can properly use the information processing system 10. The print control unit 115 may cause the image forming device 500 to execute the printing via another device (for example, a server) that manages or controls the printing of the image forming device 500, instead of directly giving the instruction to print to the image forming device 500.

Figure 3:
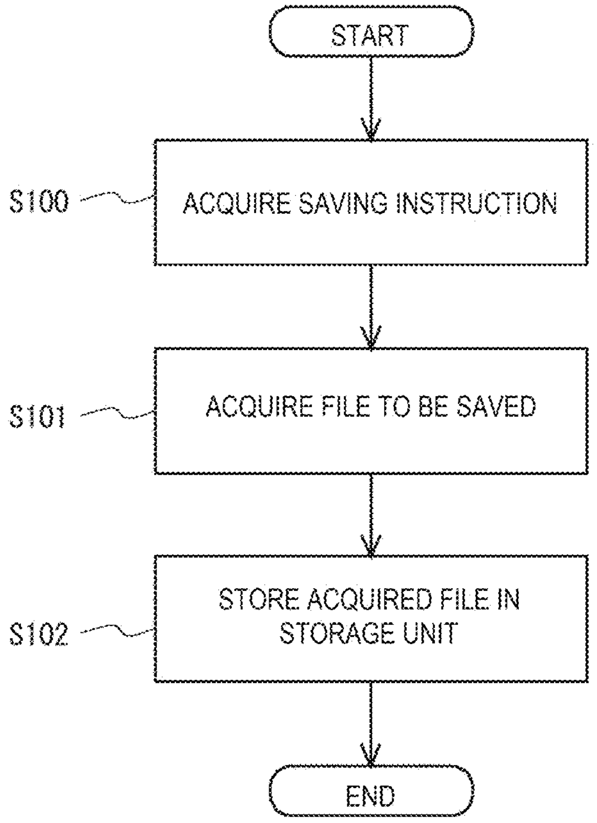
FIG. 3 is a flowchart showing an example of a flow of operations by the print control device when a file is saved in a storage unit.

A flow of operations by the above print control device 100 will now be described. FIG. 3 is a flowchart showing an example of a flow of operations by the print control device 100 when a file is saved in the storage unit 170. The flow of operations when a file is saved will now be described with reference to FIG. 3. In step S100, the saving instruction acquisition unit 111 acquires a saving instruction. Next, in step S101, the file acquisition unit 112 acquires a file to be saved corresponding to the saving instruction acquired in step S100. Then, in step S102, the file acquisition unit 112 causes the storage unit 170 to store the file acquired in step S101. Thus, the file is saved in the storage unit 170. In this step, the posting processing unit 113 may post a text or the like informing that the saving has been properly performed, in the chat room.

Figure 4:
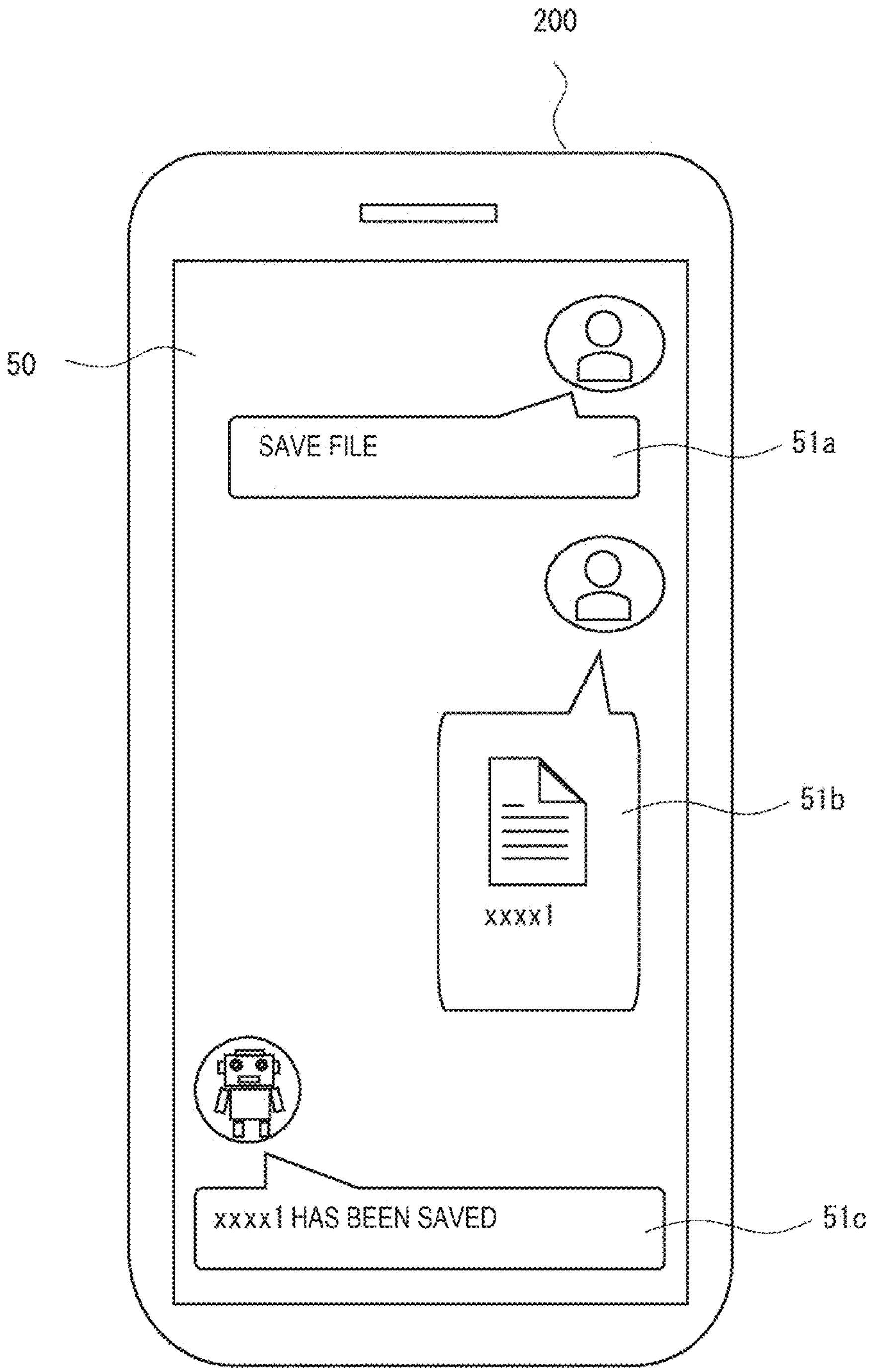
FIG. 4 is a schematic view showing an example of a screen of a terminal device when saving of a file is performed via a chat service.

FIG. 4 is a schematic view showing an example of the screen of the terminal device 200 when the saving of a file is performed via the chat service. In the example shown in FIG. 4, the user U is posting a text 51*a* of "Save file" and a file 51*b* to be saved, in a chat room 50. These postings are acquired by the print control device 100 as the saving instruction and the file to be saved in the above steps S100 and S101. As the file 51*b* is saved in the storage unit 170 in the above step S103, the posting processing unit 113 of the print control device 100 posts a text 51*c* informing that the saving has been properly performed, in the chat room 50.

Figure 5:
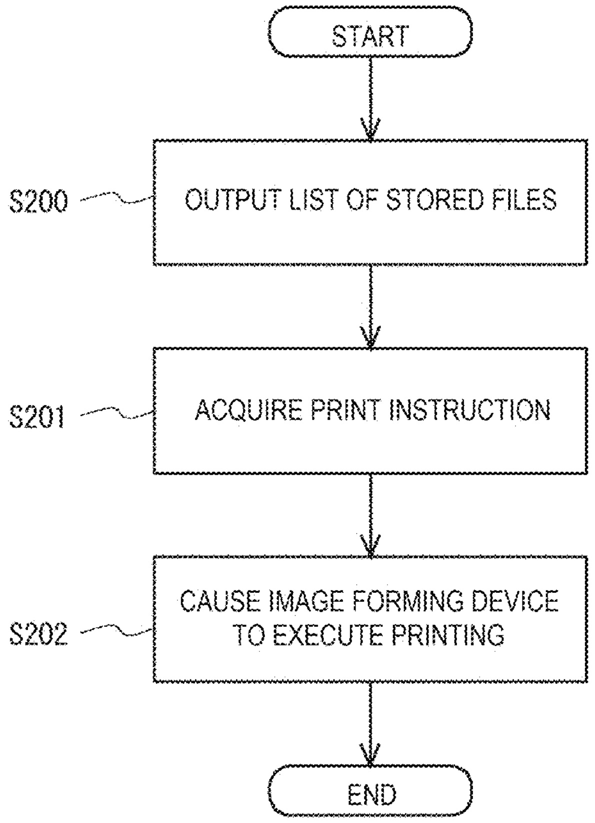
FIG. 5 is a flowchart showing an example of a flow operations by the print control device when printing a file saved in the storage unit.

A flow of operations when a file is printed will now be described. FIG. 5 is a flowchart showing an example of operations by the print control device 100 when printing a file saved in the storage unit 170. The flow of operations when a file is printed will now be described with reference to FIG. 5. In step S200, the posting processing unit 113 outputs a list of files stored in the storage unit 170. In this embodiment, the posting processing unit 113 posts the list in the chat room. Next, in step S201, the print instruction acquisition unit 114 acquires a print instruction. In this flowchart, the print instruction acquisition unit 114 acquires a print instruction including the selection of a file to be printed from the list outputted in step S200. Next, in step S202, the print control unit 115 causes the image forming device 500 to execute the printing of the file for which the instruction to print is given by the print instruction acquired in step S201. At this point, the posting processing unit 113 may post a text or the like informing that printing will be started, in the chat room.

FIG. 6 is a schematic view showing an example of the screen of the terminal device 200 when the printing of a file is performed via the chat service. In the example shown in FIG. 6, when the user U posts a text 52*a* of "File list" in the chat room 50, the posting processing unit 113 in the above step S200 posts a list 52*b* of files corresponding to the user U stored in the storage unit 170, in the chat room 50. In the example shown in FIG. 6, the print button 521 is provided for each of the saved files given in the list 52*b*. The list may include not only the print button 521 but also other buttons such as a button to configure print settings. In the example shown in FIG. 6, an icon 522 of a file and a file name 523 are displayed for each file in the list 52*b*, but the list may be at least a list of files stored in the storage unit 170 and the specific display form of the list is not limited to the display form shown in FIG. 6. Also, in the list, a nickname of a file may be displayed instead of the file name or along with the file name. When the user U selects a file which the user wants to print from among the files in the list 52*b*, the printing of the file is performed. Specifically, when the user U presses the print button 521 corresponding to a file which the user wants to print from among the files in the list 52*b*, the print instruction acquisition unit 114 in the above step S201 acquires a print instruction giving an instruction to print this file. In the example shown in FIG. 6, the print button 521 of a file with a file name "xxxx1" is pressed and the print instruction acquisition unit 114 acquires a print instruction for the file. Thus, in the above step S202, the processing of causing the image forming device 500 to execute the printing of the file is performed. The posting processing unit 113 then posts a text 52*c* informing that printing will be started, in the chat room 50.

Figure 7:
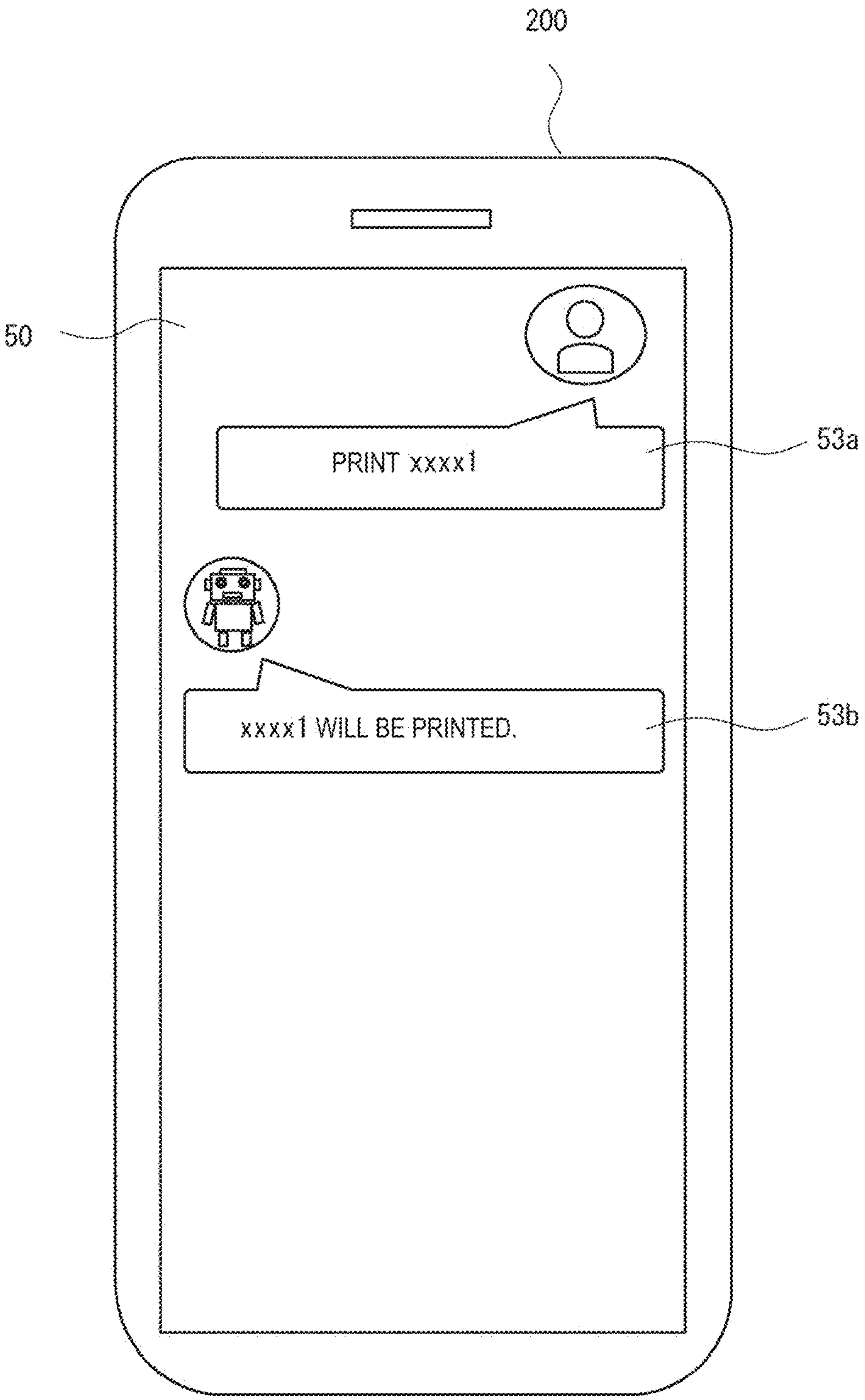
FIG. 7 is a schematic view showing another example of the screen of the terminal device when printing of a file is performed via the chat service.

FIG. 7 is a schematic view showing another example of the screen of the terminal device 200 when the printing of a file is performed via the chat service. As described above, the user U may post a text specifying a file to be printed and requesting the printing thereof in the chat room, as the print instruction. In the example shown in FIG. 7, the user U posts a text 53*a* of "Print xxxx1" in the chat room 50. In this case, step S200 in FIG. 5 is omitted and the print instruction acquisition unit 114 acquires this posting as the print instruction in the above step S201. While the user U posts the file name in the example shown in FIG. 7, the user U may post the nickname of the file instead of the file name. As the print instruction acquisition unit 114 acquires the print instruction, the processing of causing the image forming device 500 to execute the printing of the file is performed in the above step S202 and the posting processing unit 113 posts a text 53*b* informing that printing will be started, in the chat room.

Embodiment 1 has been described above. In this embodiment, a file is stored in the print control device 100 in response to a saving instruction. Then, in response to a print instruction giving an instruction to print the file stored in the print control device 100, the printing of the file is performed. That is, the user can cause the image forming device 500 to print the file simply by designating the file stored in the print control device 100 as a file to be printed. Therefore, once the user performs the work of storing a file in the print control device 100, the user can easily print the file. That is, the user no longer needs to find out a file to be printed from the terminal device 200 or the cloud storage 400 or the like each time, and the time and effort of the user can be saved. The above characteristic configuration of the print control device 100 is particularly effective when the same file needs to be repeatedly printed regularly or irregularly.

Embodiment 2

Embodiment 2 will now be described. In the foregoing Embodiment 1, the acquisition of a saving instruction and the acquisition of a print instruction by the print control device 100 are limited to the acquisition via the chat server 300. Meanwhile, in the present embodiment, a configuration that enables the acquisition of a saving instruction and a print instruction without using the chat server 300, in addition to the acquisition of a saving instruction and a print instruction via the chat server 300, will be described. While a print control device 100*a*, described below, has both the function of acquiring a saving instruction and a print instruction via the chat server 300 and the function of acquiring a saving instruction and a print instruction without using the chat server 300, various modifications such as a configuration having only one of these functions can be made as a matter of course.

This embodiment differs from the information processing system 10 described in Embodiment 1 in that the print control device 100 is replaced by the print control device 100*a*. In this embodiment, the print control device 100*a* is coupled communicably with the terminal device 200 via the network N, and the terminal device 200 can access the print control device 100*a*. In this embodiment, the chat app installed in the terminal device 200 includes a browser to transmit a saving instruction and a print instruction to the print control device 100*a* without using the chat server 300. However, when a browser is installed in the terminal device 200 separately from the chat app, the chat app may not include a browser. Configurations and processing that are different from those in Embodiment 1 will now be described and the description of configurations and processing similar to those in Embodiment 1 will be omitted where appropriate.

Figure 8:
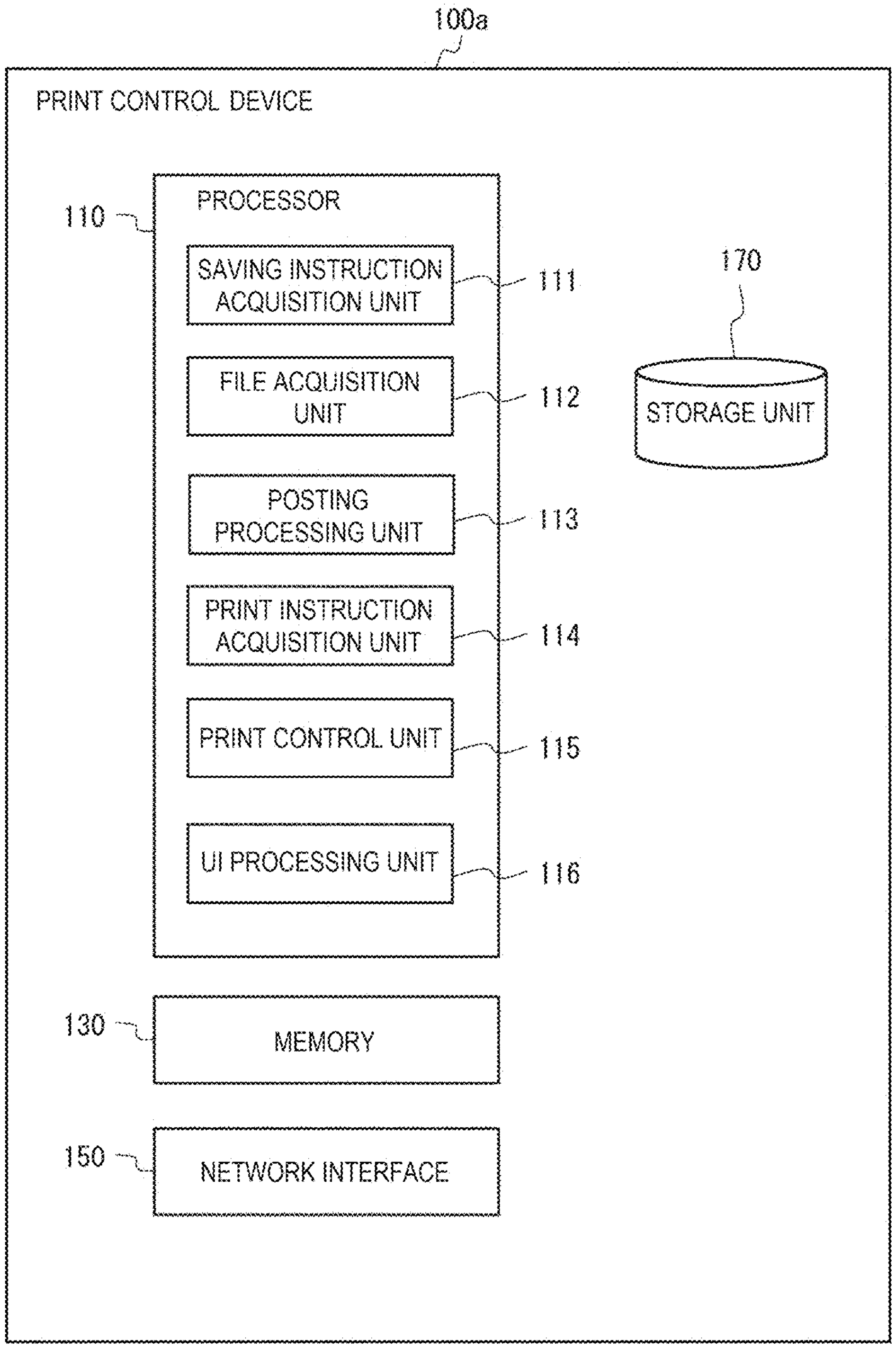
FIG. 8 is a block diagram showing an example of the configuration of a print control device according to Embodiment 2.

FIG. 8 is a block diagram showing an example of the configuration of the print control device 100*a* according to Embodiment 2. As shown in FIG. 8, the print control device 100*a* differs from the print control device 100 in additionally having a user interface (UI) processing unit 116. The functions of the UI processing unit 116 are implemented, for example, by the processor 110 reading a program from the memory 130 and executing the program.

The UI processing unit 116 performs processing of providing a user interface to acquire a saving instruction and a print instruction from the user U (that is, the terminal device 200). To describe this more in detail, the UI processing unit 116 performs processing of providing a web page displayed on the browser of the terminal device 200. The UI processing unit 116 provides a web page to accept a saving instruction. The UI processing unit 116 also provides a web page to accept a print instruction. The UI processing unit 116 also provides a web page where a list of files stored in the storage unit 170 is displayed. That is, the UI processing unit 116 outputs the list of files stored in the storage unit 170 to the terminal device 200. The list of files stored in the storage unit 170 may be displayed on the web page to accept a print instruction.

In this embodiment, the saving instruction acquisition unit 111 acquires a saving instruction directly from the terminal device 200, based on an input to the web page provided to the terminal device 200 by the UI processing unit 116. That is, the saving instruction acquisition unit 111 acquires a saving instruction for a file via the browser operating at the terminal device 200. In other words, the saving instruction acquisition unit 111 acquires a saving instruction for a file via the web page provided to the terminal device 200 by the UI processing unit 116. Such a configuration enables the user U to give a saving instruction by a method other than the method using the chat room and therefore improves the convenience for the user. The saving instruction acquisition unit 111 may acquire a saving instruction inputted to the web page, along with the identification information of the user U giving the saving instruction.

In this embodiment, the print instruction acquisition unit 114 acquires a print instruction directly from the terminal device 200, based on an input to the web page provided to the terminal device 200 by the UI processing unit 116. That is, the print instruction acquisition unit 114 acquires a print instruction for a file via the browser operating at the terminal device 200. In other words, the print instruction acquisition unit 114 acquires a print instruction for a file via the web page provided to the terminal device 200 by the UI processing unit 116. Such a configuration enables the user U to give a print instruction by a method other than the method using the chat room and therefore improves the convenience for the user. The print instruction acquisition unit 114 may acquire a print instruction inputted to the web page, along with the identification information of the user U giving the print instruction.

The flow of operations by the print control device 100*a* when a file is saved in the storage unit 170 is similar to the flow shown in FIG. 3. However, in this embodiment, in step S100, the saving instruction acquisition unit 111 may acquire a saving instruction via the chat service or may acquire a saving instruction via the web page provided by the UI processing unit 116.

The flow of operations by the print control device 100*a* when printing a file saved in the storage unit 170 is similar to the flow shown in FIG. 5. However, in this embodiment, in step S200, the UI processing unit 116 may output a web page including a list of files stored in the storage unit 170 to the terminal device 200, instead of the posting of the list by the posting processing unit 113. In this embodiment, in step S201, the print instruction acquisition unit 114 may acquire a print instruction via the chat service or may acquire a print instruction via the web page provided by the UI processing unit 116. When acquiring a print instruction via the web page, the print instruction acquisition unit 114 acquires a print instruction including the selection of a file to be printed from the list displayed on the web page.

Figure 9A:
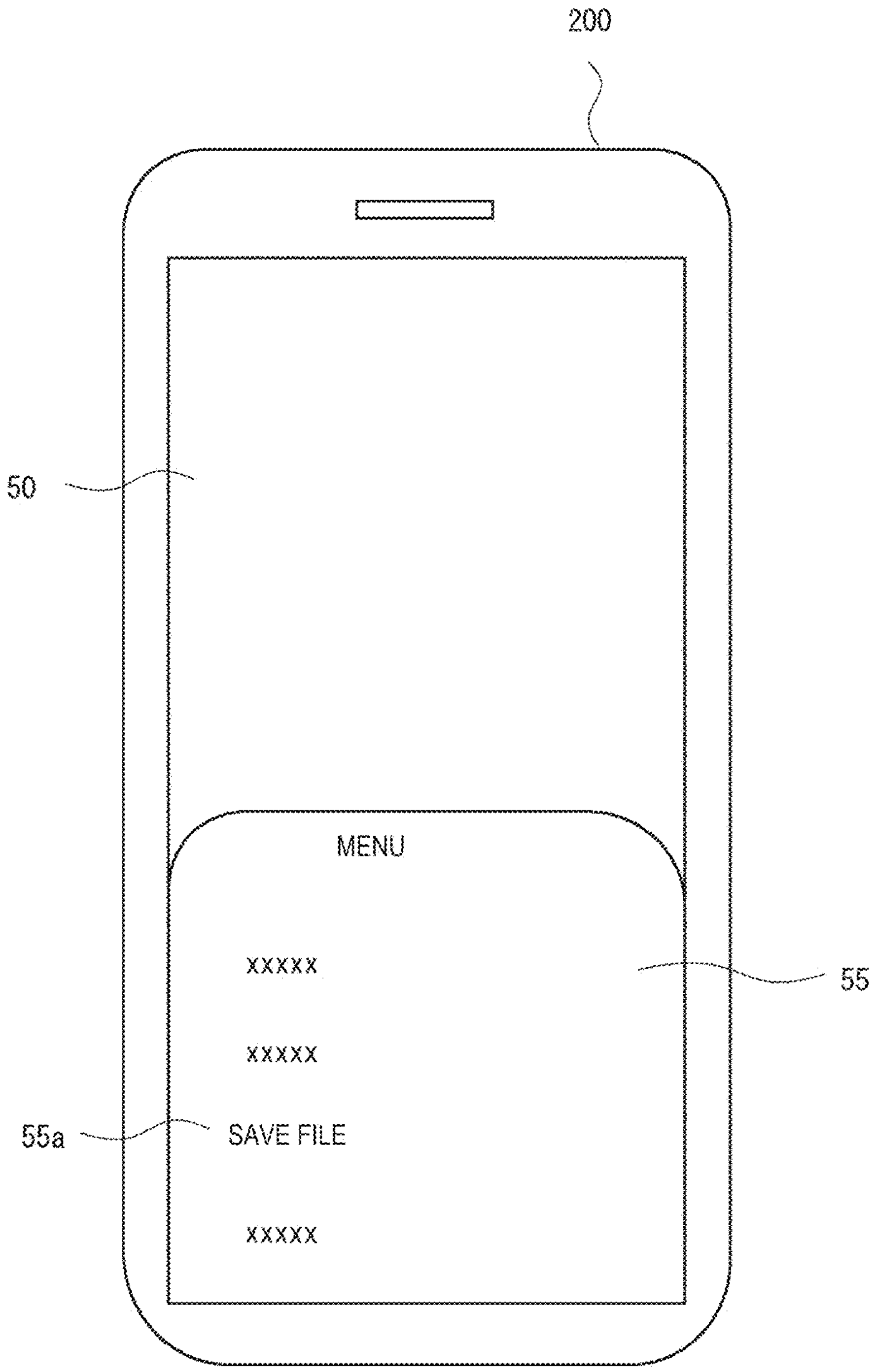
FIG. 9A is a schematic view showing an example of the screen of the terminal device when saving of a file is performed via a browser.
Figure 9B:
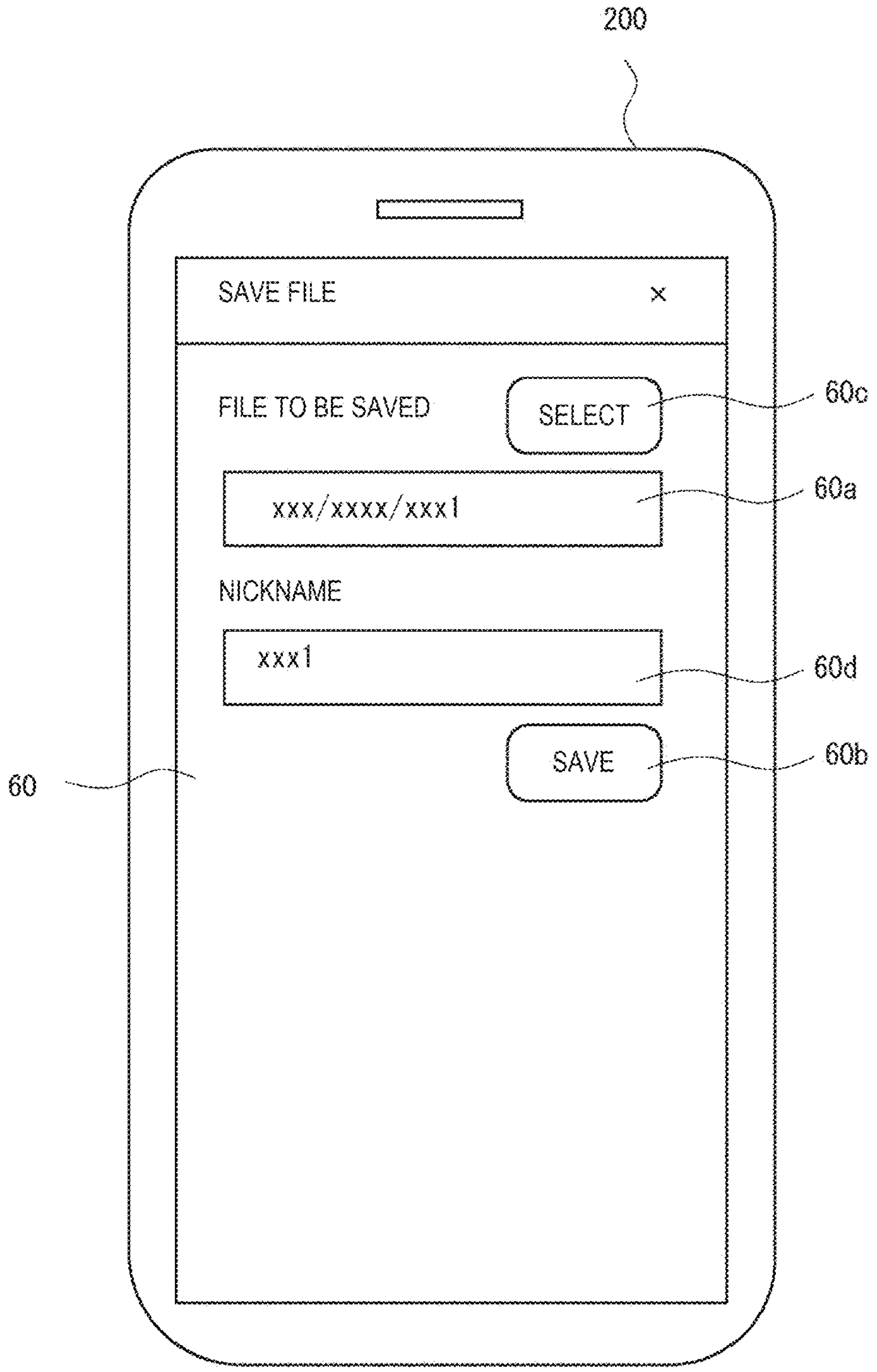
FIG. 9B is a schematic view showing an example of the screen of the terminal device when saving of a file is performed via the browser.

FIGS. 9A and 9B are schematic views showing an example of the screen of the terminal device 200 when the saving of a file is performed via the browser. Particularly, FIG. 9A shows an example of the screen of the terminal device 200 when a menu 55 of the chat app installed in the terminal device 200 is opened. In FIG. 9A, the chat room 50 and the menu 55 are displayed on the terminal device 200. FIG. 9B shows an example of a web page 60 displayed on the terminal device 200 by the browser. The web page 60 shown in FIG. 9B is a web page to accept a saving instruction and is provided by the UI processing unit 116. As shown in FIG. 9A, the menu 55 includes a menu item 55*a* to display the web page 60 used to transmit a saving instruction to the print control device 100*a*. When the menu item 55*a* is selected by the user U, the web page 60 shown in FIG. 9B is displayed. In the example shown in FIG. 9B, the web page 60 includes an input field 60*a* to designate a file to be saved, and a button 60*b* to execute the transmission of a saving instruction. In the input field 60*a*, the file path of a file stored in the terminal device 200 may be inputted or the URL of a file stored in the cloud storage 400 may be inputted. When the file path of a file stored in the terminal device 200 is inputted in the input field 60*a* and the button 60*b* is pressed, the file is transmitted from the terminal device 200 to the print control device 100*a* as a file to be saved. On the web page 60, a button 60*c* to select the location of a file and thus designate the file, instead of inputting a character string to the input field 60*a*, is provided. The web page 60 also includes an input field 60*d* to designate a nickname of a file to be saved. When the button 60*b* is pressed, a saving instruction is transmitted from the terminal device 200 to the print control device 100*a*.

Figure 10A:
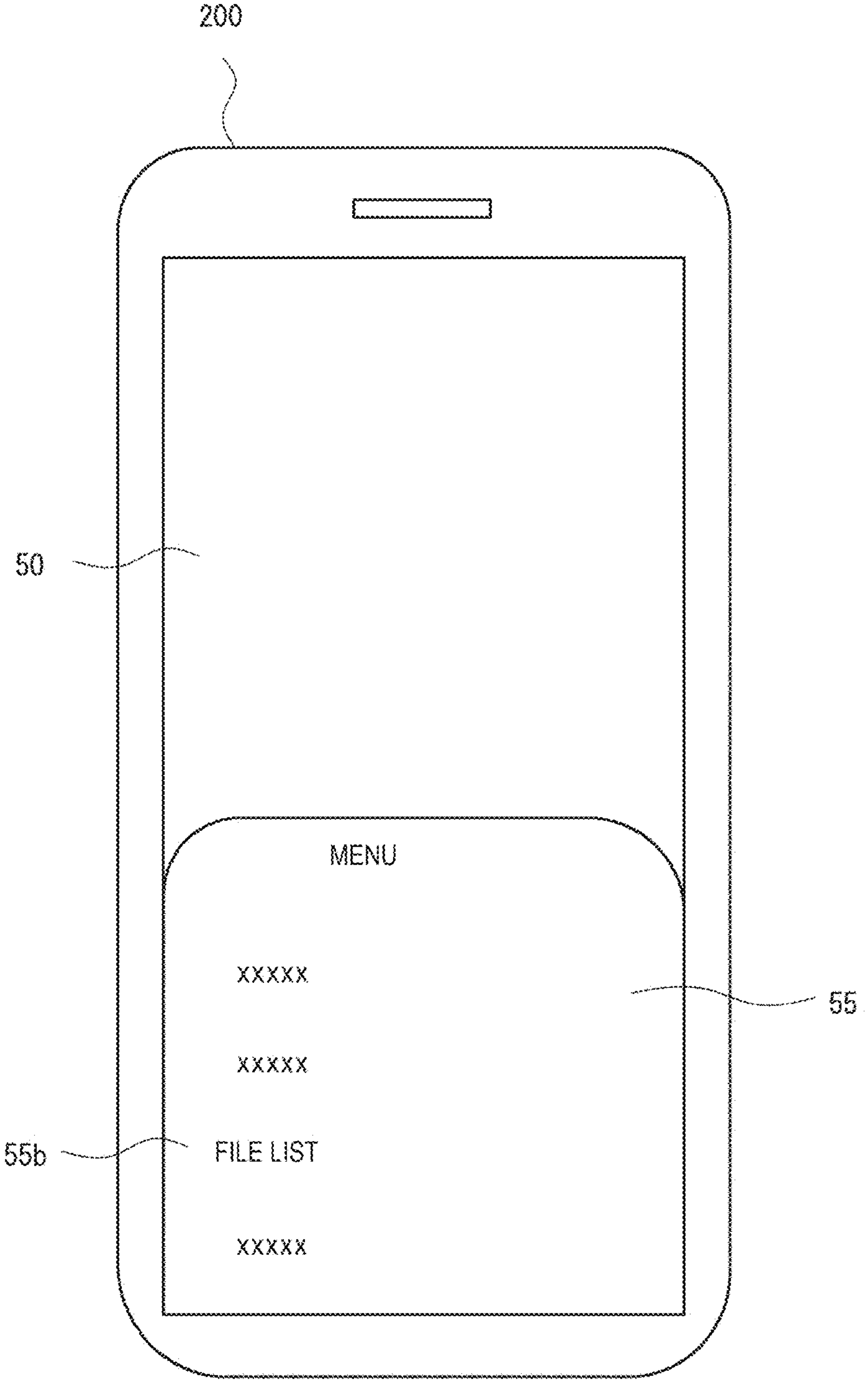
FIG. 10A is a schematic view showing an example of the screen of the terminal device when printing of a file is performed via the browser.
Figure 10B:
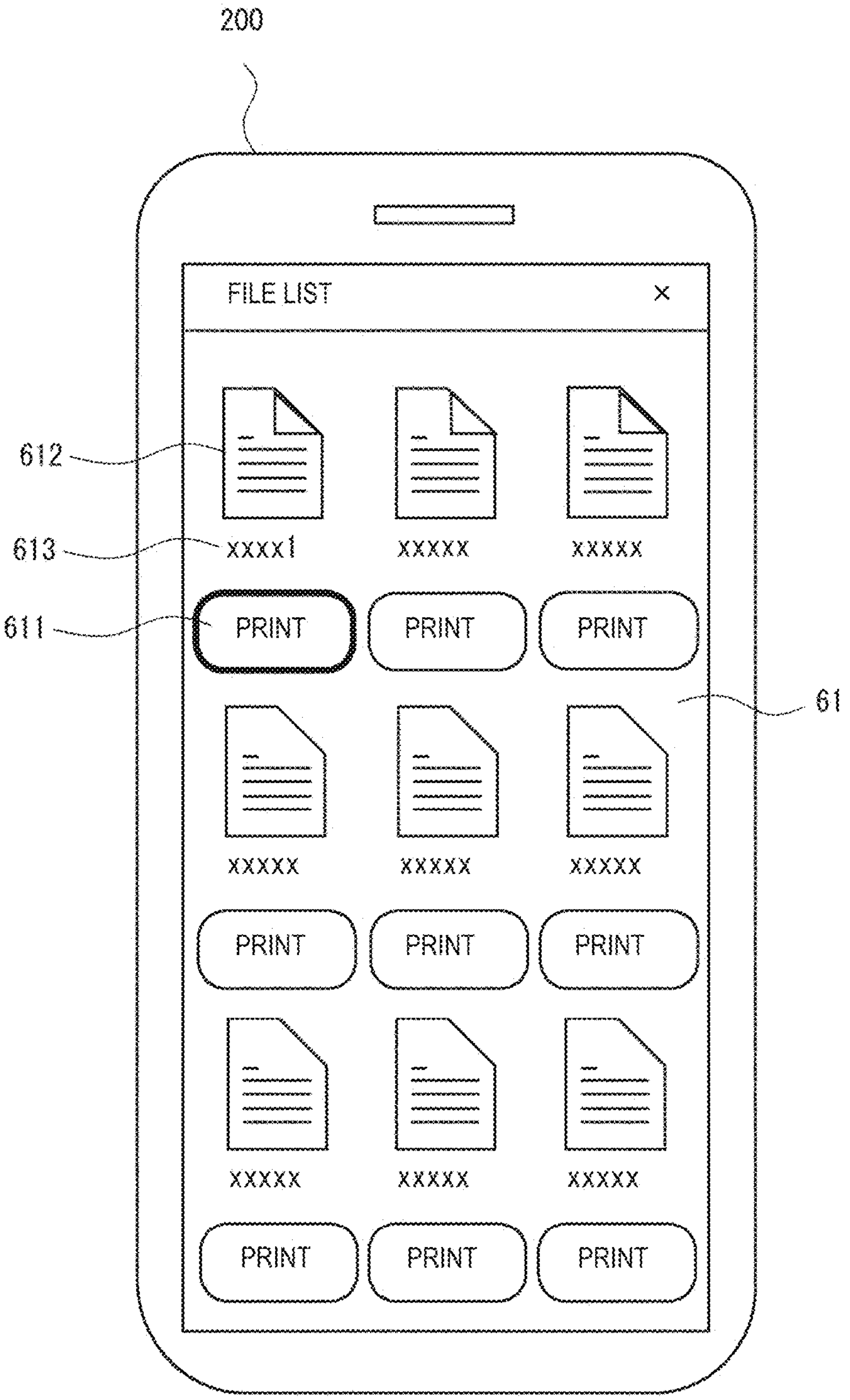
FIG. 10B is a schematic view showing an example of the screen of the terminal device when printing of a file is performed via the browser.
Figure 10C:
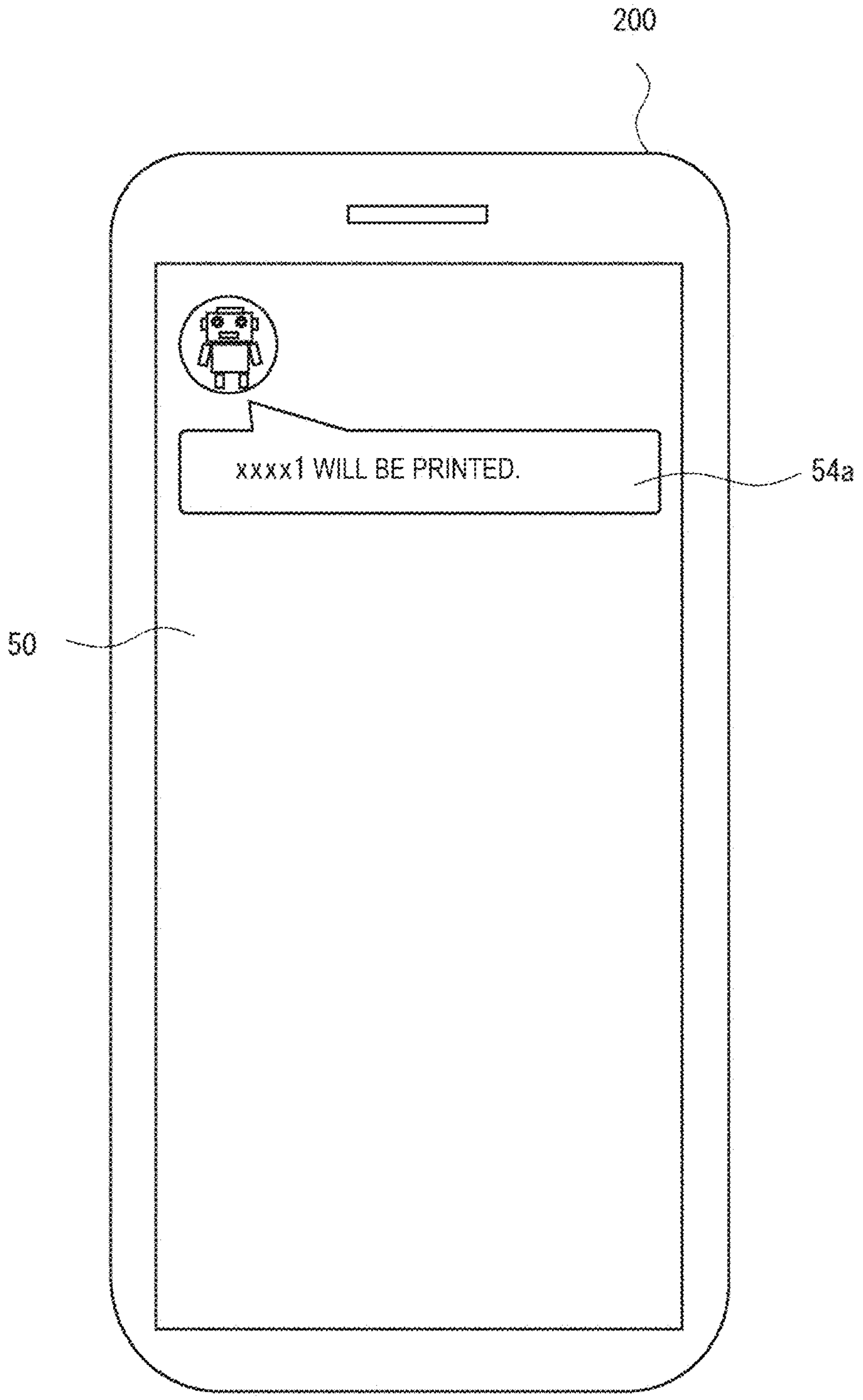
FIG. 10C is a schematic view showing an example of the screen of the terminal device when printing of a file is performed via the browser.

FIGS. 10A, 10B, and 10C are schematic views showing an example of the screen of the terminal device 200 when the printing of a file is performed via the browser. Particularly, FIG. 10A shows an example of the screen of the terminal device 200 when the menu 55 of the chat app installed in the terminal device 200 is opened. In FIG. 10A, the chat room 50 and the menu 55 are displayed on the terminal device 200. FIG. 10B shows an example of a web page 61 displayed on the terminal device 200 by the browser. The web page 61 shown in FIG. 10B is a web page to accept a print instruction and is provided by the UI processing unit 116. The web page 61 includes a list of files stored in the storage unit 170. FIG. 10C shows an example of a message posted in the chat room 50 by the print control device 100*a* after a print instruction is transmitted from the terminal device 200 via the browser.

As shown in FIG. 10A, the menu 55 includes a menu item 55*b* to display the web page 61 including a list of files saved in the print control device 100*a*. When the menu item 55*b* is selected by the user U, the web page 61 shown in FIG. 10B is displayed. The web page 61 includes a list of files saved in the print control device 100*a* and corresponding to the user U. In the example shown in FIG. 10B, a print button 611 is provided for each of the saved files in the list. The web page 61 may include not only the print button 611 but also other buttons such as a button to configure print settings. In the example shown in FIG. 10B, an icon 612 of a file and a file name 613 are displayed for each file, but the list displayed on the web page 61 may be at least a list of files stored in the storage unit 170 and the specific display form of the list is not limited to the display form shown in FIG. 10B. Also, on the web page 61, a nickname of a file may be displayed instead of the file name or along with the file name. When the user U selects a file which the user wants to print from among the files in the list displayed on the web page 61, the printing of the file is performed. Specifically, when the user U presses the print button 611 corresponding to a file which the user wants to print from among the files in the list displayed on the web page 61, a print instruction giving an instruction to print this file is transmitted from the terminal device 200 to the print control device 100*a*. Thus, the print instruction acquisition unit 114 acquires the print instruction giving the instruction to print this file. In the example shown in FIG. 10B, the print button 611 of a file with a file name "xxxx1" is pressed and the print instruction acquisition unit 114 acquires a print instruction for the file. Subsequently, the print control unit 115 causes the image forming device 500 to execute the printing of the file. Then, as shown in FIG. 10C, the posting processing unit 113 posts a text 54*a* informing that printing will be started, in the chat room 50.

Embodiment 2 has been described above. In this embodiment, the UI processing unit 116 provides the user interface (that is, the web page) to acquire a saving instruction or a print instruction directly from the terminal device 200. Therefore, the user U can give a saving instruction or a print instruction by a method other the method using the chat room. Thus, the convenience for the user is improved.

While some embodiments have been described above, the present disclosure is not limited to the above embodiments and changes can be made without departing from the spirit and scope of the present disclosure. For example, the print instruction acquisition unit 114 may acquire a print instruction giving an instruction to print a file that is not stored in the storage unit 170. This print instruction may be acquired via the chat service or may be acquired via the user interface (web page) provided by the UI processing unit 116. In this case, the file acquisition unit 112 acquires a file to be printed corresponding to the print instruction from the terminal device 200 or the cloud storage 400 or the like. Also, while the storage unit 170 in the above embodiments stores only a file for which an instruction to save is given by a saving instruction, the storage unit 170 may also store a file for which an instruction to print is given by a print instruction. In this case, when the file acquisition unit 112 acquires a file to be printed corresponding to the print instruction, the file acquisition unit 112 causes the storage unit 170 to store this file. Such a configuration enables the user to print again a file that has been printed in the past, without finding the file from the terminal device 200 or the cloud storage 400 or the like.

In the list of files stored in the storage unit 170, a predetermined indication may be added to a file that has been printed in the past. For example, in the list, a file that has been printed in the past may be highlighted as compared with a file that has not been printed yet. Also, for example, in the list, a mark or a text indicating that the file has already been printed may be added to a file that has been printed in the past. As a predetermined indication is added to a file that has been printed in the past in the list, the user viewing the list can easily determine which file has already been printed. Thus, the convenience for the user is improved. Also, in the list of files stored in the storage unit 170, a predetermined indication may be added to a file that has never been printed, instead of a file that has been printed in the past.

A part of all of the above embodiments may be described as in the appendices given below but are not limited thereto.

Appendix 1

A print control device configured to be able to communicate with a terminal device via a chat server providing a chat service is provided, the print control device including: a saving instruction acquisition unit configured to acquire a saving instruction giving an instruction to save a file, from the terminal device via the chat service; a file acquisition unit configured to acquire a file to be saved corresponding to the saving instruction; a storage unit configured to store the acquired file; a print instruction acquisition unit configured to acquire a print instruction giving an instruction to print the stored file, from the terminal device via the chat service; and a print control unit configured to cause an image forming device to execute printing of the file for which the instruction to print is given by the print instruction.

Appendix 2

In the print control device according to Appendix 1, the saving instruction acquisition unit acquires the saving instruction given in a chat room used for the chat service, and the print instruction acquisition unit acquires the print instruction given in the chat room.

Appendix 3

In the print control device according to Appendix 1 or 2, the print instruction acquisition unit further acquires a print instruction giving an instruction to print a file that is not stored in the storage unit, the file acquisition unit further acquires a file to be printed corresponding to the print instruction, and the storage unit further stores the file to be printed.

Appendix 4

The print control device according to one of Appendices 1 to 3 further includes a posting processing unit configured to post a list of the file stored in the storage unit, in a chat room used for the chat service, and the print instruction acquisition unit acquires an instruction including a selection of a file to be printed from the list, as the print instruction.

Appendix 5

In the print control device according to Appendix 4, a predetermined indication is added to a file that is printed in the past in the list.

Appendix 6

In the print control device according to one of Appendices 1 to 5, the saving instruction acquisition unit acquires identification information of a user giving the saving instruction, along with the saving instruction, and the storage unit stores the file in association with the identification information of the user.

Appendix 7

In the print control device according to one of Appendices 1 to 6, the print instruction acquisition unit acquires identification information of a user giving the print instruction, along with the print instruction, and the print control unit causes the image forming device corresponding to the identification information of the user to execute printing of the file.

Appendix 8

In the print control device according to one of Appendices 1 to 7, the saving instruction acquisition unit further acquires the saving instruction via a browser operating at the terminal device.

Appendix 9

In the print control device according to one of Appendices 1 to 8, the print instruction acquisition unit further acquires the print instruction via a browser operating at the terminal device.

Appendix 10

A control method for a print control device configured to be able to communicate with a terminal device via a chat server providing a chat service is provided, the control method including: acquiring a saving instruction giving an instruction to save a file, from the terminal device via the chat service; acquiring a file to be saved corresponding to the saving instruction; causing a storage unit to store the acquired file; acquiring a print instruction giving an instruction to print the stored file, from the terminal device via the chat service; and causing an image forming device to execute printing of the file for which the instruction to print is given by the print instruction.

Appendix 11

A non-transitory computer-readable storage medium storing a program is provided, the program causing a computer of a print control device configured to be able to communicate with a terminal device via a chat server providing a chat service to execute: a saving instruction acquisition step of acquiring a saving instruction giving an instruction to save a file, from the terminal device via the chat service; a file acquisition step of acquiring a file to be saved corresponding to the saving instruction; a storage step of causing a storage unit to store the acquired file; a print instruction acquisition step of acquiring a print instruction giving an instruction to print the stored file, from the terminal device via the chat service; and a print control step of causing an image forming device to execute printing of the file for which the instruction to print is given by the print instruction.

What is claimed is:

1. A print control device configured to be able to communicate with a terminal device via a chat server providing a chat service, the print control device comprising:

a saving instruction acquisition unit configured to acquire a saving instruction giving an instruction to save a file, from the terminal device via the chat service;

a file acquisition unit configured to acquire a file to be saved corresponding to the saving instruction;

a storage configured to store the acquired file;

a print instruction acquisition unit configured to acquire a print instruction giving an instruction to print the stored file, from the terminal device via the chat service; and a print controller configured to cause an image forming device to execute printing of the file for which the instruction to print is given by the print instruction.

2. The print control device according to claim 1, wherein the saving instruction acquisition unit acquires the saving instruction given in a chat room used for the chat service, and the print instruction acquisition unit acquires the print instruction given in the chat room.

3. The print control device according to claim 1, wherein the print instruction acquisition unit further acquires a print instruction giving an instruction to print a file that is not stored in the storage, the file acquisition unit further acquires a file to be printed corresponding to the print instruction, and the storage further stores the file to be printed.

4. The print control device according to claim 1, further comprising:

a posting processor configured to post a list of the file stored in the storage, in a chat room used for the chat service, wherein the print instruction acquisition unit acquires an instruction including a selection of a file to be printed from the list, as the print instruction.

5. The print control device according to claim 4, wherein a predetermined indication is added to a file that is printed in the past in the list.

6. The print control device according to claim 1, wherein the saving instruction acquisition unit acquires identification information of a user giving the saving instruction, along with the saving instruction, and the storage stores the file in association with the identification information of the user.

7. The print control device according to claim 1, wherein the print instruction acquisition unit acquires identification information of a user giving the print instruction, along with the print instruction, and the print controller causes the image forming device corresponding to the identification information of the user to execute printing of the file.

8. The print control device according to claim 1, wherein the saving instruction acquisition unit further acquires the saving instruction via a browser operating at the terminal device.

9. The print control device according to claim 1, wherein the print instruction acquisition unit further acquires the print instruction via a browser operating at the terminal device.

10. A control method for a print control device configured to be able to communicate with a terminal device via a chat server providing a chat service, the control method comprising:

acquiring a saving instruction giving an instruction to save a file, from the terminal device via the chat service;

acquiring a file to be saved corresponding to the saving instruction;

causing a storage to store the acquired file;

acquiring a print instruction giving an instruction to print the stored file, from the terminal device via the chat service; and causing an image forming device to execute printing of the file for which the instruction to print is given by the print instruction.

11. A non-transitory computer-readable storage medium storing a program, the program causing a computer of a print control device configured to be able to communicate with a terminal device via a chat server providing a chat service to execute:

a saving instruction acquisition step of acquiring a saving instruction giving an instruction to save a file, from the terminal device via the chat service;

a file acquisition step of acquiring a file to be saved corresponding to the saving instruction;

a storage step of causing a storage to store the acquired file;

a print instruction acquisition step of acquiring a print instruction giving an instruction to print the stored file, from the terminal device via the chat service; and a print control step of causing an image forming device to execute printing of the file for which the instruction to print is given by the print instruction.

* * * * *